United States Patent [19]
Corby, Jr. et al.

[11] Patent Number: 5,805,289
[45] Date of Patent: Sep. 8, 1998

[54] PORTABLE MEASUREMENT SYSTEM USING IMAGE AND POINT MEASUREMENT DEVICES

[75] Inventors: Nelson Raymond Corby, Jr., Scotia; Christopher Allen Nafis, Vischer Ferry; Boris Yamrom, Schenectady, all of N.Y.

[73] Assignee: General Electric Company, Schenectady, N.Y.

[21] Appl. No.: 888,795

[22] Filed: Jul. 7, 1997

[51] Int. Cl.[6] .................................................. G01B 11/24
[52] U.S. Cl. ........................ 356/376; 356/375; 364/560; 382/285; 395/119
[58] Field of Search .................................. 356/375, 376, 356/357, 358; 364/506, 550, 559, 560, 552, 474.17, 474.29, 474.37; 382/285, 291; 395/119, 120, 125; 33/551

[56] References Cited

U.S. PATENT DOCUMENTS

| | | | |
|---|---|---|---|
| 4,662,752 | 5/1987 | Tucker et al. | 356/375 |
| 4,724,525 | 2/1988 | Purcell et al. | 356/357 |
| 5,276,613 | 1/1994 | Schlumberger | 364/413.16 |
| 5,396,331 | 3/1995 | Kitoh et al. | 356/376 |
| 5,446,545 | 8/1995 | Taylor et al. | 356/358 |
| 5,471,541 | 11/1995 | Burtnyk et al. | 356/376 |
| 5,598,515 | 1/1997 | Shashua | 395/122 |
| 5,604,593 | 2/1997 | McMurtry | 356/358 |
| 5,617,645 | 4/1997 | Wick et al. | 33/551 |
| 5,627,771 | 5/1997 | Makino | 364/560 |
| 5,642,293 | 6/1997 | Manthey et al. | 364/508 |
| 5,661,667 | 8/1997 | Rueb et al. | 356/375 |

*Primary Examiner*—Hoa Q. Pham
*Attorney, Agent, or Firm*—Lawrence P. Zale; Marvin Snyder

[57] ABSTRACT

Calibrated spatial reference devices (SRDs) of known dimensions having targets at known relative locations are attached to a large structure to be measured. A design device employs a digital camera to acquire digital images of 'islands' of the structure including the SRDs and employs photogrammetry techniques to determine relative locations of 'islands' within a large structure. A highly accurate coordinate measurement device provides absolute 3D measured locations of the targets used to convert the relative photogrammetry locations into absolute 3D locations. A monitor displays the digital images, measured 3D locations, photogrammetry locations in a superimposed manner to a user and a user interface allows the user to select objects to be measured. Image detection techniques are used to identify objects selected by a user and dimensions, and distances between selected objects are automatically calculated. A remote link allows remote users to interact with the device to view, select structures and measure dimensions. The device is also capable of storing any type of imagery, notes, voice annotations, and also capable of retrieving archived information. This allows a time-lapse playback of objects indicating wear or corrosion.

8 Claims, 5 Drawing Sheets

PORTABLE MEASUREMENT SYSTEM USING IMAGE AND POINT MEASUREMENT DEVICES

BACKGROUND OF THE INVENTION

1. Field of the Invention

The present invention related to measurement and design of unique replacement parts for large industrial structures.

2. Discussion of Prior Art

It is often necessary to manufacture replacement parts for large, high precision industrial machines such as steam turbines and generators. Typically, the large casing structure is to be reused and the internal stationary and rotating parts are to be replaced. In order to manufacture these replacement parts, it is necessary to measure a large number of interior dimensions of the case of the turbine. In addition to 'over all' dimensions, it is often required to precisely measure the dimensions within many small '3D islands' and to then precisely relate these 3D islands to each other, within the larger, 3D space of the turbine case.

The measurement activities often occur during a shut down, or maintenance period, during which the turbine is out of service and disassembled. The utility owner wishes to minimize the length of the shutdown period, since no revenue is produced during the outage. Thus, the utility allows access for a period of 3–4 days on average. Also, during this access period, personnel measuring the case must share access with many other workers. The restricted 'time window' places severe restrictions on the amount of data that can be gathered during the visit.

Much time also goes into preparing a detailed plan of exactly what to measure during the on-site visit. The pre-planning is difficult, since often the interior design of the unit is not known in advance.

After the service period, the unit is re-assembled and returned to service until the next scheduled shutdown, typically 2–3 years later.

After the on-site visit has concluded, the turbine or generator service company must prepare initial part designs, a price quotation and (if successful in bidding) then prepare detailed manufacturing drawings to guide the manufacture of the replacement parts over the next 12–24 months. At the next opportunity usually 18–24 months later during the next turbine overhaul, the service company returns and installs the new replacement parts. If the parts are incorrect at delivery, then costly on-site machining may be necessary to correct the design. If the re-machining process delays the return of the turbine to service, then the service company may incur cost penalties.

The primary problem is how to make accurate measurements within and between many 'islands of detail' distributed over one large object.

Commercial photogrammetry techniques have been used to measure 3D locations within a set of convergent 2D images. Since the accuracy of the measurement decreases as the size of the field of view increases, it is usually not possible to get high accuracy measurements of large objects. Any one small 3D area can be measured to high precision but when the field-of-view of the photo samples are large enough to span all of the 'islands' at once, lower accuracy results.

Other methods may be used which 'leap frogs' through several overlapping sets of images to determine overall dimensions. This process rarely gives high accuracy results since there can be a sizable 'stackup' of errors. Some vendors of commercial photogrammetry systems are Rollei, GSI, Vexcel and Imetric.

Portable coordinate measurement machines (CMMs) allow the 3D coordinates of specific points on the turbine to be measured directly and accurately. The working volume of some types of portable CMMs can be large (30–40 feet radius) and the accuracy can be very high (perhaps +/−0.001 to 0.005 inches). The CMM package is portable and compact and can be mounted directly on the turbine case being measured. Some problems with point measurements made via CMM are:

1. Only those points that are physically 'touched' are measured;
2. The measurement process, though fast, allows for recording only a selected subset of all possible points;
3. Once the CMM is removed from the site, no more measurements can be made;
4. Keeping track of measured points as well as 'visualizing' the measurements is difficult. Complicated hand sketches are needed to 'make sense' of the list of measured points.

Two types of portable CMMs exist—optical and mechanical. Two manufacturers of optical portable CMMs are SMX and Leica. One manufacturer of a portable mechanical CMM is Faro Technologies. The mechanical types are less useful since the 'reach' of the arm is usually only 3–5 feet, necessitating 'leap frogging' as describe before. The optical CMMs typically use a 1.5 inch diameter target sphere (with an internal retro-reflector) to touch and measure surface points. Various tooling exists to adapt this large target ball to the specifics of the measurement task.

A further complication is that usually the part designers are not the same people who visited the site and performed the measurements. It would also be desirable to provide the design staff with a method to measure needed dimensions during a later time off-site.

In many cases, the parts being replaced represent a new or amended design for the service company. Thus, it is currently necessary for a skilled design engineer to accompany the group to the site and to guide the measurement process. Given the small number of such engineers, it can be difficult to locate and send such a person on short notice.

Fortunately, it turns out that not all measurements need share the same accuracy. Some dimensions must be known to very high accuracy (perhaps +/−0.005 inches) while other dimensions need to be less precise (perhaps +/−0.010 inches) and some require only approximate 'ballpark' measurements (perhaps +/−0.030 inches).

Thus, it would be desirable to develop a system that would allow high-accuracy measurements to be made during a time-limited site visit, allow medium-precision measurements to be made from sets of images after the visit, allow 'virtual' visits by specialists during the onsite visit, and finally provide integrated visualizations of measurements and images for later analysis by designers.

SUMMARY OF THE INVENTION

The invention provides a portable system that can be taken to a site, setup rapidly and be used to measure the dimensions of a critical set of features at the highest possible precision during the visit and that will allow other less critical measurements to be made at a later time from data carried away by the site team. The on-site high precision measurements would be made using one of many types of 'portable' coordinate measurement machine (CMM) systems being manufactured today. These systems record the 3D position of a reference probe touching the object surface at points of interest. In addition, during the site visit, data from special high-speed surface 'profilers' can be included in the data. These scanners provide dense maps of x,y,z points on the object's surface. The post-visit measurements would be performed on sets of high resolution digital pictures using photogrammetric software resident within the system. Methods would be provided to tie together these sub-systems. In addition, the user should be able to view CMM point measurements pictorially, for example superimposing the points over images of the turbine rather than to have to deal with lists of named points with XYZ coordinate data.

The system would have a 'tele-review' capability allowing specialists located off-site to view images produced by the on-site personnel, to converse with on-site staff (for example, using text, images or voice) and to participate (in a virtual manner) in the on-site visit. Also, the remotely located experts should be able to review any measurements or 3D data produced by on-site staff. Such communication should be rapid with little lag.

The system would create a non-volatile database (e.g. CD-ROM disk) of images and measurements of the unit suitable for review at a later time. The images in such an archive would be annotated with spatial and temporal information sufficient to allow spatial, temporal or functional inquiries and retrieval.

The system would provide a graphical user interface that would allow the user to access, review and 'browse' the 2D image database, the point measurement database, any 3D CAD descriptions produced thus far, any 'scanned-in' sketches or operator notes as well as audio comments recorded on-site. This permanent record can be augmented (for example, as further photogrammetric measurements are made) by the user using the system interface.

BRIEF DESCRIPTION OF THE DRAWINGS

While the novel features of the invention are set forth with particularly in the appended claims, the invention, both as to organization and content, will be better understood and appreciated, along with other objects and features thereof, from the following detailed description taken in conjunction with the drawings, in which:

DETAILED DESCRIPTION OF THE INVENTION

Figure 1:
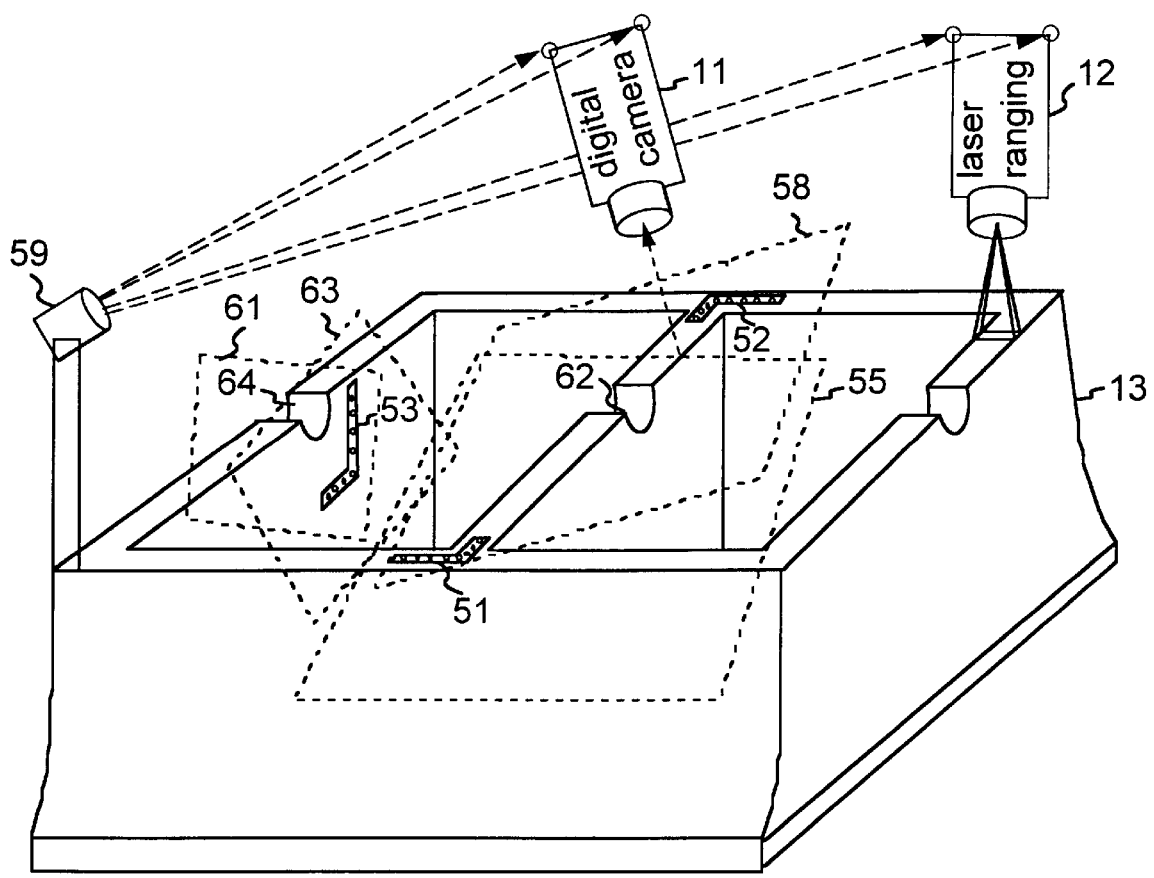
FIG. 1 is an illustration of a large industrial machine casing structure for which replacement parts are to be manufactured.

The laser imaging measurement system (LIMS) may be best described in connection with FIGS. 1 and 2.

A large high precision industrial structure 13 is to be measured and examined in a short period of time on site and later, off-site replacement parts are to be manufactured without access to the original structure 13. Due to the principles of photogrammetry if several overlapping images are collected which show a number of points common to each of the images, and the angles and location of the camera which took the images are known, the relative 3D location of the common points may be determined.

In the process of manufacturing replacement parts for structure 13, it is important to note that the precision of some regions, for example, bearings 62 and 64, must be known to higher precision than other locations such as outside casings of structure 13. However, after the structure 13 has been reassembled, there still may be a need to obtain other measurements of parts, not necessarily with a high degree of precision, required to manufacture the parts.

In order to determine a scale and absolute orientation of sub-images, it is beneficial to use a spatial reference device (SRD) having a known distance between reference points, and known dimensions. A spatial reference device is shown in greater detail in FIG. 4, to be discussed later.

SRDs 51, 52, 53, are positioned on structure 13, at locations where 3D locations and dimensions are to be determined.

A digital camera 11 obtains overlapping images 55, 58 of an 'island' around bearing 62. A coordinate measurement machine (CMM) 15, having a base 16, measures points on digital camera 11 and calculates its location and orientation ('pose') for each photo.

In an optional embodiment, a laser ranging device 12 scans the surface of object 13 to determine 3D coordinates of the surface. Again, CMM 15 monitors the pose of laser ranging device 12 to determine the absolute surface coordinates.

Figure 3:
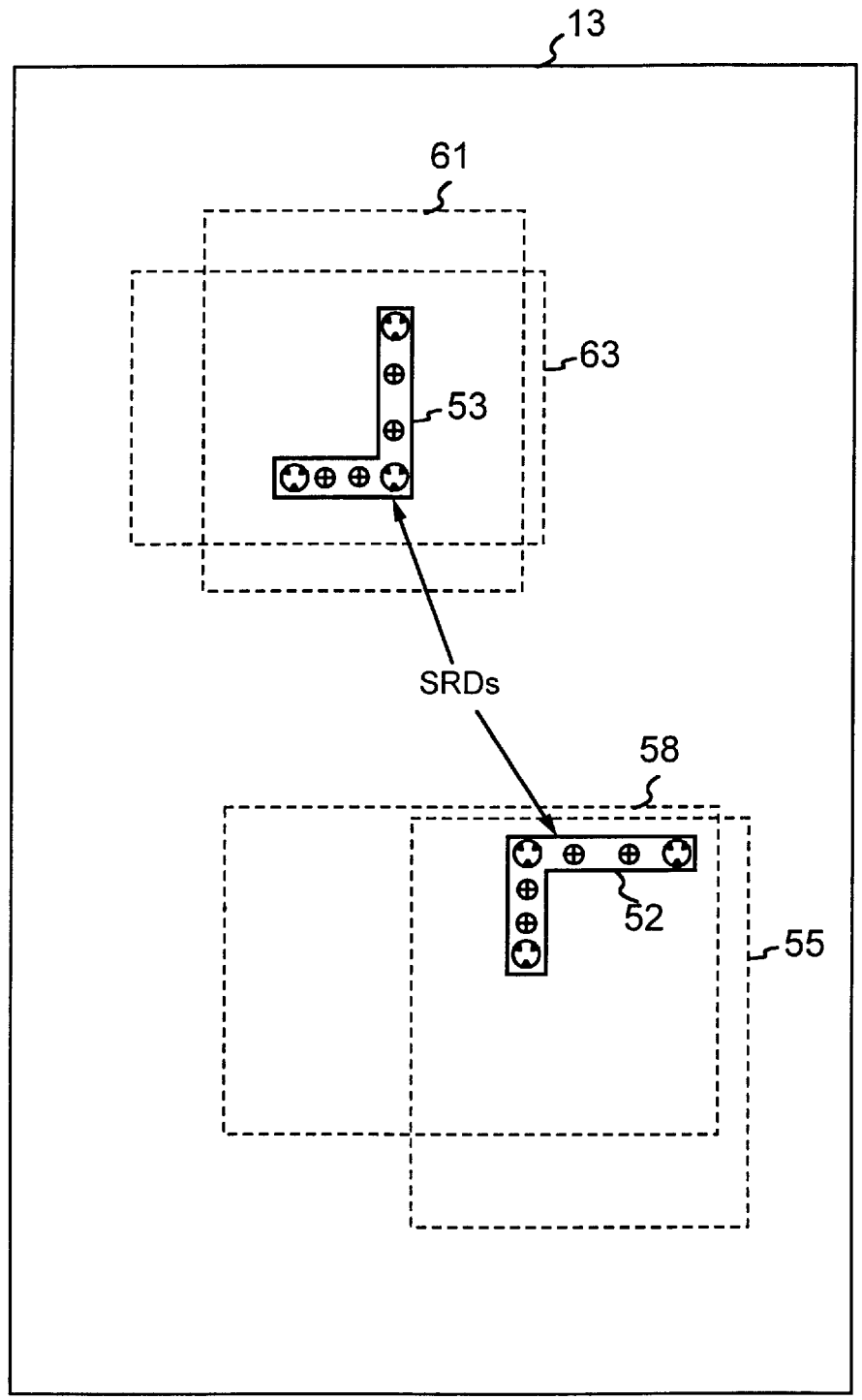
FIG. 3 is an illustration of the principle of photogrammetry employed buy the present invention.

FIG. 3 illustrates the principle of the invention which allows two or more disjoint 3D areas to be photogrammetrically related. The user mounts a spatial reference device (SRD) with very accurately, known dimensions near the feature 'island' to me studied, so as to be visible within the field of view of each image of the area. The user acquires two or more images at Area 1 using the system digital high resolution camera. The only requirements are that each image contain the SRD and that the camera angle of each image approximately converge to a common area of the island. The user then identifies the 2D target centers of each visible target of the SRD for each image of the set. Without moving the SRD from the position in which it was photographed, the user measures the actual world 3D coordinates of the target centers of the optical targets of the SRD using the CMM. Depending on the type of SRD, the physically measured points need not lie in or on the optical targets (see FIGS. 4 and 5). Thus, each target point that was detected photogrammetrically also has absolute 3D coordinates in the indicated global CMM coordinate system. The user now moves to Area 2 (and any other areas) and repeats the process. After this process is complete, it can be seen that:

1. Any point measured from image set 1 or 2 (or any other image set) can be expressed in the same common absolute global 3D coordinates
2. It is possible to calculate dimensions between a feature in image set 1 and image set 2

Figure 4:
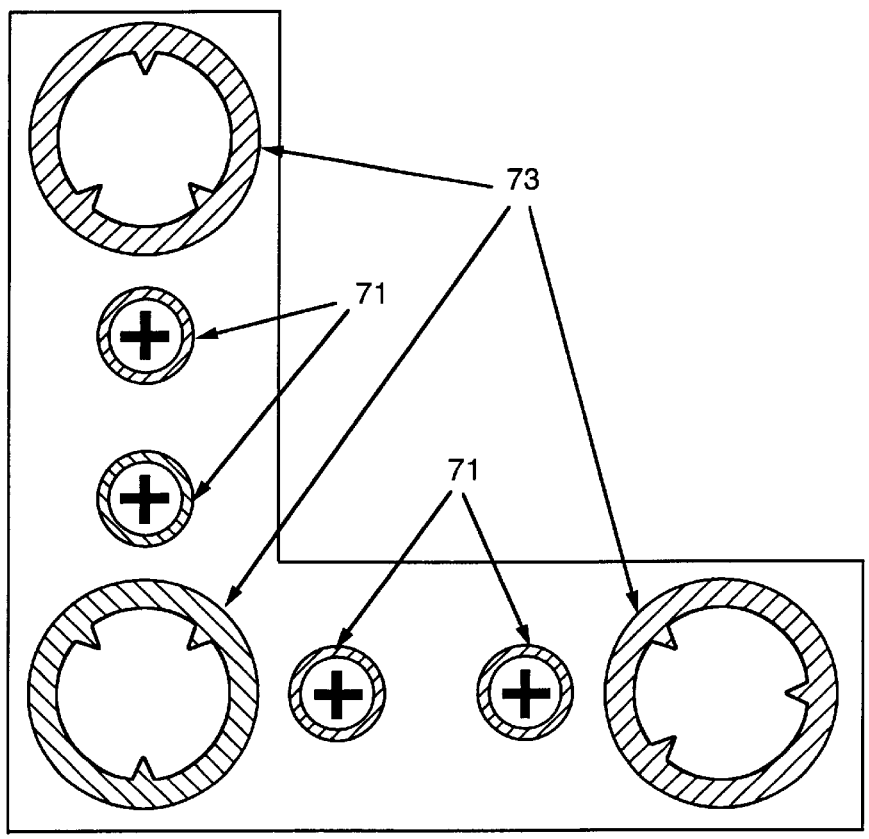
FIG. 4 is an illustration of one embodiment of a spatial reference device (SRD) compatible with the present invention.

FIG. 4 shows an example of a SRD constructed and used in our current system. This SRD consists of a precision machined stainless steel L-shaped bar. It may be any known dimension. This one was 6 inches by 9 inches and 0.5 inches thick. Mounted on the bar are four optical button targets 71

(0.020 inch thick) and three '3 point kinematic mounts' 73 that hold a 1.5 inch diameter optical target such as those manufactured by SMX Corp. for use with our SMX 4000 Tracking Laser Interferometer (our optical CMM). These are typical dimensions and products which may be used. Since the geometry is known and fixed, it is possible to calculate the 3D coordinates of the target buttons given the CMM-measured 3D coordinates of the 3 point kinematic mounts.

Figure 5:
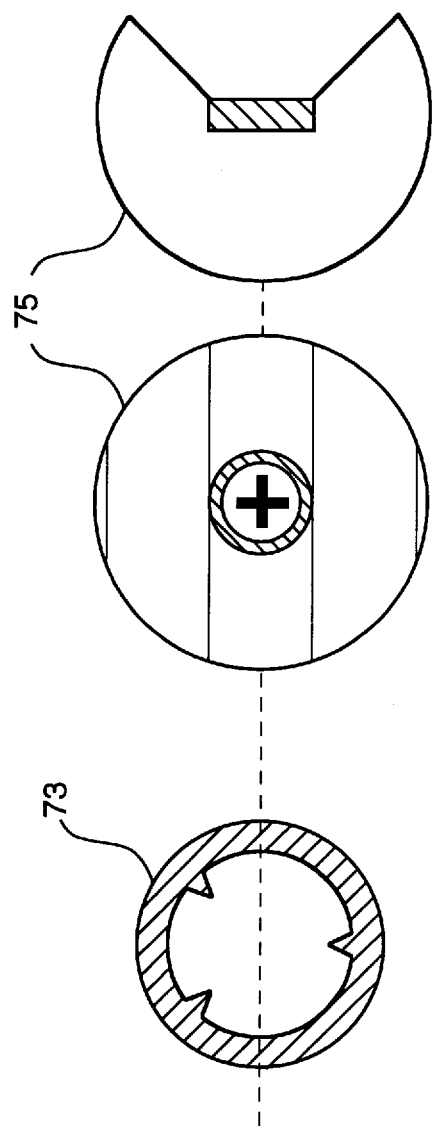
FIG. 5 is an illustration of a single point SRD having a 3-point kinematic mount and a target sphere.

FIG. 5 shows a single point SRD having a 3-point kinematic mount 73 and a target sphere 75 such as a 'Theodolite 1.5 Sphere' manufactured by Hubbs Machine & Manufacturing. The 3D center of sphere 75 is constructed so as to fall exactly in the same height as the center of optical target 71 used with our optical CMM. At least three such single point SRDs would need to be used with placement in the images dictated by standard photogrammetric practice.

Figure 6:
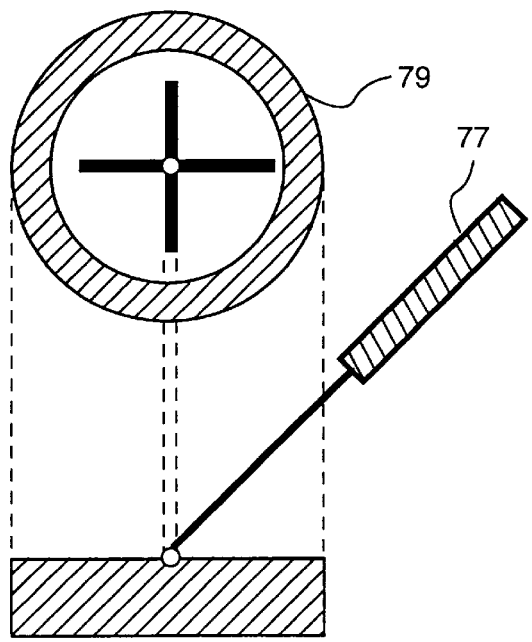
FIG. 6 is an illustration of a single point SRD for use with a touchprobe compatible with the present invention.

FIG. 6 shows a single point SRD for use with a touch-probe 79 (such as a Faro Technologies CMM). An L-shaped SRD (similar to the one in FIG. 4) could be constructed using three or more single point SRDs of this type.

Conventional photogrammetry techniques may be used to determine the 3D locations of target spheres and optical buttons 71 of the spatial reference device from the multiple redundant images from the digital camera 11. These will all be defined in a 3D coordinate system relative to an arbitrary origin point somewhere common to the multiple redundant digital images.

Figure 2:
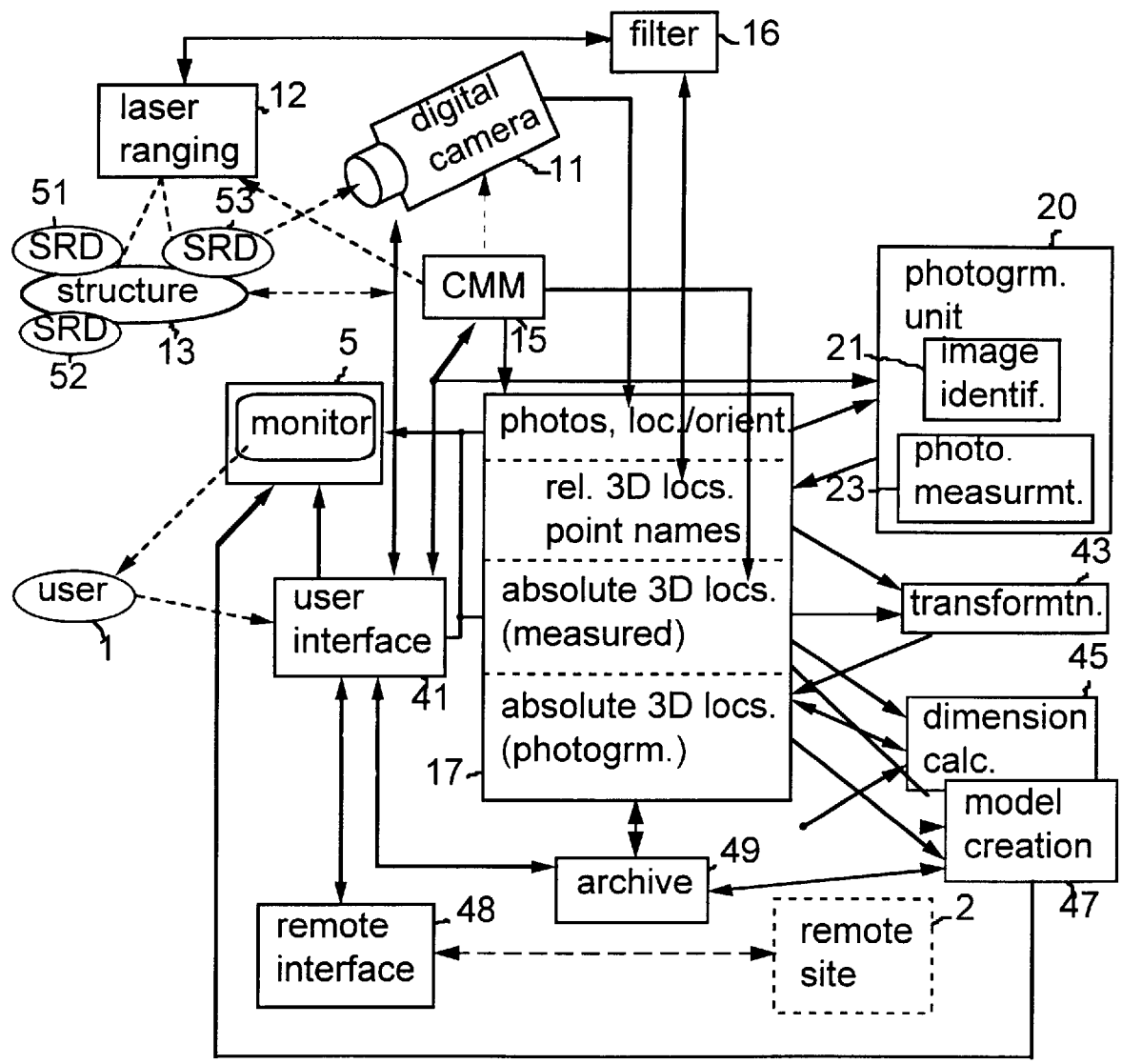
FIG. 2 is a simplified block diagram of the functional components of the present invention.

Referring now to FIG. 2, the digital camera 11 obtains images of structure 13 and stores it in a memory 17 which may be separate or segmented to allow storage of different types of information.

A portable (PCMM) is fixed with respect to structure 13. In the preferred embodiment, an optical CMM is used, however, a touch probe arm may also be employed. The CMM will measure absolute locations within the structure coordinate system. For example, one can assume that the location at which the CMM is attached to structure 13 is the absolute xyz origin and all other points measured by CMM are relative to this origin. Some photogrammetry devices require the position and orientation of the camera to be known, while others do not. If the position of the camera is required, the CMM measures at least 3 points on the body of the camera. From these measurements, the camera pose can be calculated.

The coordinates measured by the CMM are placed within memory 17 along with the image from digital camera 11.

A photogrammetry unit 20 reads in the digital images, the locations of points on the digital camera (if needed to determine the pose of the camera when the picture was taken) and performs standard photogrammetry techniques to determine the relative 3D locations of common points on the images. The digital photographs acquired by digital camera 11 are fed to a monitor 5 capable of displaying graphic images, text, or audio, which a user 1 monitors to see the images. User 1 also interacts with user interface 41 to select a point on each image representing the same optical button 71 or CMM target 75. This information is provided to photogrammetry unit 20. The point selected may also be given a label or name in order to refer to them at a later time. As points and labels are selected, they are interactively displayed to the user on monitor 5.

Monitor 5 may also distort the 2D images to appear to be viewed form a user-selected viewpoint.

From these common selected points over several images stored in memory 17, photogrammetry unit 20 can determine a relative 3D location of each of those common points, which is also stored in a different segment of memory 17.

The above description has focused on the methods by which photogrammetric data may be created and used. User 1 may also operate CMM device 15 to make absolute measurements of structures which are stored in memory 17 and operate user interface 41 to select a corresponding location on one of the images by viewing monitor 5 and interacting with user interface 41.

It is important to note that there can be three different types of information obtained by the system. There is the actual, high resolution point measurements acquired by CMM 15, the approximate less accurate information acquired by photogrammetry unit 20, and finally, the high-density 'range maps' provided by the laser ranging camera 12.

Since accuracy and precision are very important in this invention, photogrammetry unit 20 in connection with user interface 41 can operate to automatically select a closest structure to that selected by user 1. For example, if user interface 41 is a typical mouse and monitor 5 employs a video screen showing the images, user 1 may operate user interface 41 to move an arrow to a structure on the image which user 1 desires to measure or select. Conventional video imaging techniques may be used such as edge detection, fitting lines to edges, fitting circles or ovals to shapes to identify structures and to highlight a closest structure. User interface may allow the user 1 to select the highlighted structure. There may also be other conventional tools built into either user interface 41 or photogrammetry unit 20 to allow the center of a structure to be selected, to select a place where cross hairs intersect, or choose a mid-point of a line. These allow accurate selection of points on the images which are not limited to user's ability to manipulate a mouse.

These image identification functions may be performed by an image identification device 21 within photogrammetry unit 20. Also optionally, a photo measurement device 23 may be incorporated into photogrammetry unit 20 which can automatically select and determine distances between selected objects or points within an image. Being that each image will have a spatial reference device of known size and dimensions, photogrammetry units and photo measurement device 23 can easily determine the scale of the image, the orientation of the image, and distances between selected structures of the image. The output of photogrammetry unit and any embedded devices is also stored in memory 17. These, however, are only relative locations. To convert from the relative 3D locations to actual 3D locations, information of the actual location of a reference point within the images is required. Therefore, a CMM device is mounted on structure 13 and used to measure the actual location, in structure coordinates, of the target spheres on the spatial reference devices 51, 52, 53. Any of the relative 3D locations now in memory 17 may be transformed (rotated and translated) by a translation device 43.

As stated before, the accuracy of photogrammetry is related to the field-of-view. Using a very large field-of-view results in a low accuracy, and conversely a small field-of-view results in high accuracy. The problem with small field-of-view is that on large structures such as 13, several of these 'islands' as shown as areas in dotted lines 55, 58, 61 and 63 may be located within the same coordinate system without 'stack up error'.

A dimension calculation unit 45 may be used to calculate 3D dimensions between actual 3D locations which may be selected by a user 1 through interface 41. For highest accuracy, it would be best to measure dimensions from actual 3D measured locations (using the CMM data) as opposed to those which are calculated from photogrammetry unit 20. In the preferred embodiment, monitor 5 shows images to user 1 on which are displayed location points. The displayed points are 'tagged' to convey the device of the measurement (i.e. CMM, laser ranging, or photogrammetry device). These points may all be ovedayed on the images obtained from digital camera 11.

Since there will be personnel located off-site and a small number of people located on-site, it may be necessary for the off-site personnel to interact with the on-site personnel and to view measurements and images as they are acquired. This may be for the purpose of notifying on-site personnel to acquire more or different images or measurements. For this purpose, a remote interface is connected to user interface 41 and remotely operated by off-site personnel. Using conventional techniques in computer tele-networking, video audio measurements, text and other data may be readily exchanged between the on-site and off-site systems. One possible method of providing this may be a conventional program such as Netscape™ employing TCP/IP over a secure line which also has speech capabilities. The present invention currently implements a solution of this type.

In another optional embodiment of the present invention, a model creation device 47 may be used having the same connections as dimension calculation device 45. This model creation device interacts with the user interface and memory 17. The photographic images, the 3D measured locations and the 3D photogrammetric locations may be assembled into portions of a model of structure 13. This model may then be interfaced with a computer aided design (CAD) system to interactively design new machine parts to fit in with the model of structure 13. This system has the ability (therefore) to measure dimensions not originally measured on site.

In another optional embodiment, a scanning laser ranging device 12 may be used either in coordination with digital camera 11 or replacing digital camera 11. This laser ranging device scans a segment of the object surface producing a 'range image' being a set of (x,y,z) points on the surface of object 13 by determining distances from the center of laser ranging device to the first surface it encounters. CMM 15 registers the absolute pose of laser ranging device 12 in connection with the scanned data and stores this pose in memory 17. Laser scanning data is also stored in memory 17. In this embodiment, photogrammetry unit 20 is only necessary if digital two-dimensional images are used in digital camera 11.

Model creation device 47 uses the laser distance measurements from laser ranging device 12 to create a three-dimensional model of structure 13 which may be displayed by monitor 5 to user 1. Since reflection and other surface aberrations cause unreliable readings intermittently, a filter 16 may be used which smoothes the data. One such type of filter is a median filter which rejects 'outlier' points corresponding to bad or noisy data. Other types of conventional smoothing filters may be used.

Again, this model may be used in combination with a CAD modeling system to design new parts which will fit appropriately with structure 13.

Since the present invention is very useful not only in designing parts but also providing dimensions at a given time, an archive device 49 may be employed to save 'snapshots' of structure 13 at different periods in time. Archive device 49 may also be a non-volatile type of archive device such as a CD ROM. The archive device may save the 3D locations, dimensions, and tags indicating the source of the measurement data (i.e. CMM, laser scanner, photogrammetry).

Archive device 49 may also hold onto text comments, voice clips, video clips or any other relevant materials which may be captured by conventional methods. This can be stored in one complete non-volatile record of structure 13 at a given time. Since many archive segments may be stored of structure 13, it is possible to view sites of structure in a cine mode showing changes of a site over time. This can show crack growth, corrosion, wear or other time-related phenomena.

The present invention, therefore, is a novel device which can more accurately and efficiently aid in the design of replacement parts, and aid in visualization and maintenance of large, high precision industrial structures.

While specific embodiments of the invention have been illustrated and described herein, it is realized that modifications and changes will occur to those skilled in the art. It is, therefore, to be understood that the appended claims are intended to cover all such modifications and changes as fall within the true spirit and scope of the invention.

What is claimed is:

1. A design device for accurately measuring dimensions of a structure with high accuracy comprising:

a) at least one spatial reference device (SRD) attached to the structure, machined to highly accurate, known dimensions, having a plurality of reference nests each which receive a target, the nests also being visible on 2D digital images;

b) a digital camera for acquiring a plurality of high resolution 2D digital images each from an associated position and orientation, 'pose', with a field of view smaller than the entire structure, and encompassing at least one SRD;

c) a coordinate measurement machine (CMM) having a base fixed with respect to the structure, for measuring an absolute 'pose', of the digital camera for each acquired 2D image, and an absolute measured location of each of the targets, with reference to the CMM base;

d) a photogrammetry unit functionally coupled to the digital camera and the CMM, for receiving the 2D digital images and their associated poses, for determining relative 3D locations of selected structures based upon the 2D images and poses;

e) an transformation device functionally coupled to the CMM and the photogrammetry device for receiving the absolute 3D measured locations and the relative 3D photogrammetry locations, and for converting the relative 3D locations into absolute 3D photogrammetry locations;

f) a monitor for modifying the 2D digital images to be correctly viewed from a user-provided viewpoint, for displaying the modified 2D images with the absolute 3D photogrammetry, and 3D measured locations superimposed upon them in correct registration to a user as viewed from the given viewpoint;

g) a user interface coupled to the monitor, which receives user-selected input to the transformation device.

2. The design device of claim 1 further comprising:

a) dimension calculation device functionally coupled to the CMM and the transformation device for calculating absolute dimensions between user-selected 3D points;

b) a user interface coupled to the dimension calculation device, and the monitor, which receives user-selected 3D points displayed on the monitor and provides these points to the dimension calculation device, then displays the received dimensions on the monitor.

3. The design device of claim 1 further comprising:

model creation device functionally coupled to the CMM, the transformation device, and the monitor which creates a 3D computer model from the 3D measured locations and the 3D photogrammetry locations, by simulating surfaces between these points, from the user-provided viewpoint.

4. The design device of claim 1 further comprising:

an archive device coupled to the user interface for selectively retrieving stored models, digital images, 3D measured and photogrammetry locations, notes, digital voice annotations and other information from the selected time period and structure region selected, and provides it to the user interface causing it to be played as a time-lapse movie on the monitor.

5. The design device of claim 1 further comprising:

a remote interface coupled to the user interface and a site of remote users at a remote location, for providing remote user input to the user interface.

6. The design device of claim 1 further comprising:

a laser ranging device, functionally coupled to the model creation device, for scanning the surface of an object to determine distances from the laser ranging device at a plurality of points on its surface, providing relative 3D locations to the model creation device; and wherein the CMM is aimed to track a pose of the laser ranging device and provides the pose to the transformation device to determine absolute locations from the 3D relative locations.

7. The design device of claim 6 further comprising:

a filter coupled to the laser ranging device to filter out points which change abruptly from adjacent points to smooth the data, and then provides this filtered data to the model creation device in place of the unfiltered data.

8. The design device of claim 1 wherein the photogrammetry unit comprises:

a) an image identification unit which identifies on the digital images, the targets, and their center points, the boundaries of an object within the images selected by a user, and a point to be used for measurement within the object;

b) a photo measurement device which determines the scale of each of the images and then determines dimensions between measurement points of the objects.

* * * * *